US012573103B2

(12) United States Patent
Gault

(10) Patent No.: US 12,573,103 B2
(45) Date of Patent: Mar. 10, 2026

(54) ENVIRONMENT MAP UPSCALING FOR DIGITAL IMAGE GENERATION

(71) Applicant: Adobe Inc., San Jose, CA (US)

(72) Inventor: Vincent Guillaume Gault, Rubí (ES)

(73) Assignee: Adobe Inc., San Jose, CA (US)

( * ) Notice: Subject to any disclaimer, the term of this patent is extended or adjusted under 35 U.S.C. 154(b) by 279 days.

(21) Appl. No.: 18/357,499

(22) Filed: Jul. 24, 2023

(65) Prior Publication Data

US 2025/0037325 A1     Jan. 30, 2025

(51) Int. Cl.
*G06T 11/00* (2006.01)
*G06T 3/4046* (2024.01)
*G06T 5/90* (2024.01)
*G06T 15/20* (2011.01)
*G06T 15/50* (2011.01)

(52) U.S. Cl.
CPC .......... *G06T 11/001* (2013.01); *G06T 3/4046* (2013.01); *G06T 5/90* (2024.01); *G06T 15/20* (2013.01); *G06T 15/50* (2013.01); *G06T 2200/24* (2013.01); *G06T 2207/20081* (2013.01); *G06T 2207/20084* (2013.01); *G06T 2215/12* (2013.01)

(58) Field of Classification Search
CPC ....... G06T 11/001; G06T 3/4046; G06T 5/90; G06T 15/20; G06T 15/50; G06T 2200/24; G06T 2207/20081; G06T 2207/20084; G06T 2215/12
See application file for complete search history.

(56) References Cited

U.S. PATENT DOCUMENTS

| | | | | |
|---|---|---|---|---|
| 10,777,010 | B1 * | 9/2020 | Patel | G06T 15/50 |
| 2005/0270311 | A1 * | 12/2005 | Rasmussen | G09B 29/10 |
| | | | | 345/677 |
| 2006/0082577 | A1 * | 4/2006 | Carter | G06T 15/50 |
| | | | | 345/426 |
| 2006/0177150 | A1 * | 8/2006 | Uyttendaele | G06T 5/92 |
| | | | | 382/284 |
| 2006/0290950 | A1 * | 12/2006 | Platt | G06T 7/13 |
| | | | | 358/464 |
| 2016/0241892 | A1 * | 8/2016 | Cole | G06T 17/20 |
| 2017/0039765 | A1 * | 2/2017 | Zhou | G06T 7/521 |
| 2019/0095791 | A1 * | 3/2019 | Liu | G06N 3/08 |

OTHER PUBLICATIONS

Chen, Shenchang Eric. "Quicktime VR: An image-based approach to virtual environment navigation." Proceedings of the 22nd annual conference on Computer graphics and interactive techniques. 1995. (Year: 1995).*

* cited by examiner

*Primary Examiner* — Daniel F Hajnik
*Assistant Examiner* — Chris Alejandro Puntier
(74) *Attorney, Agent, or Firm* — FIG. 1 Patents

(57) ABSTRACT

Environment map upscaling techniques are described for digital image generation. A digital object and an environment map are received, the environment map defines lighting conditions within a panoramic view of an environment. A viewpoint is detected with respect to the panoramic view in the environment map. A map fragment is identified from the environment map based on the detected viewpoint and an upscaled map fragment is formed by upscaling the map fragment. A digital image is then generated based on the upscaled map fragment and the digital object as having the lighting conditions applied based on the environment map.

20 Claims, 7 Drawing Sheets

100

112

126

110

Computing Device 102

Image Processing System 104

Digital Image Generation System 116

Environment Map Upscaling Module 120

Environment Map 122

Digital Object 124

108

Digital Image 118

Network 114

Digital Content 106

300

Environment Map 122

Digital Object 124

Computing Device 102

User Interface Module 204

Viewpoint 208

600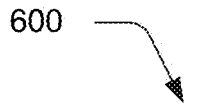

> 602
> Receive a digital object and an environment map defining lighting conditions within a panoramic view of an environment > 604
> Detect a viewpoint with respect to the panoramic view in the environment map > 606
> Identify a map fragment from the environment map based on the detected viewpoint > 608
> Form an upscaled map fragment by upscaling the map fragment > 610
> Generate a digital image based on the upscaled map fragment and the digital object

ENVIRONMENT MAP UPSCALING FOR DIGITAL IMAGE GENERATION

BACKGROUND

Panoramic images are configured to capture a view of a physical or virtual space that is otherwise beyond what a human eye is capable of viewing at any one time. Panoramic images, for instance, support a view in which a user is disposed in a middle of an environment that is navigable to view different portions of the panoramic images that surround the user, support different views of a digital object disposed within the environment (e.g., to "look around" the digital object), and so forth.

Examples of panoramic images include cylindrical panoramas, spherical panoramas, and so that may be formed using a single shot, "stitched together" from multiple images, created to represent a virtual environment, and so on. Technical challenges, however, are encountered resulting from a significant amount of data used by panoramic images in representing these environments.

SUMMARY

Environment map upscaling techniques are described for digital image generation. The environment map upscaling techniques, for instance, maintain efficiency in an amount of data stored as part of the environment map yet still support functionality that is not available via conventional techniques. In one or more examples, a digital object and an environment map are received, the environment map defines lighting conditions within a panoramic view of an environment. A viewpoint is detected with respect to the panoramic view in the environment map. A map fragment is identified from the environment map based on the detected viewpoint and an upscaled map fragment is formed by upscaling the map fragment. A digital image is then generated based on the upscaled map fragment and the digital object as having the lighting conditions applied based on the environment map.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures Entities represented in the figures are indicative of one or more entities and thus reference is made interchangeably to single or plural forms of the entities in the discussion.

FIG. 3 depicts a system in an example implementation showing operation of a user interface module of FIG. 2 in greater detail as outputting a user interface that is usable to navigate between viewpoints supported by the environment map.

FIG. 6 is a flow diagram depicting an algorithm as a step-by-step procedure in an example implementation of operations performable for accomplishing a result of environment map upscaling as part of digital image generation.

DETAILED DESCRIPTION

Overview

Figure 1:
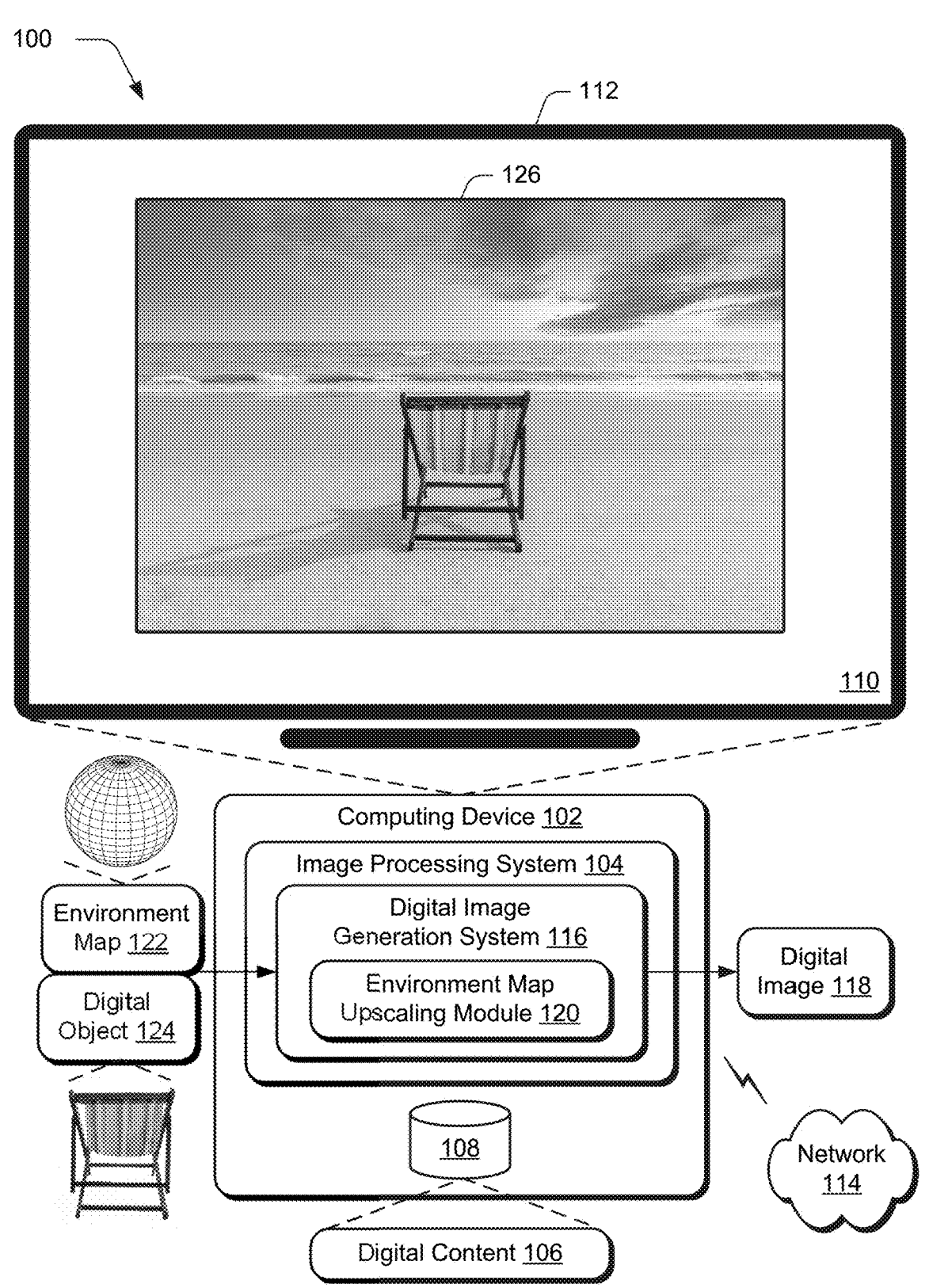
FIG. 1 is an illustration of a digital medium environment in an example implementation that is operable to employ digital image generation techniques and environment map upscaling as described herein.

Panoramic images are used to represent a plurality of views of an environment. The plurality of views, for instance, are configurable to define an environment such that an entirety of the environment is not viewable by the human eye at any one time. In one example, these techniques are usable to support different views of an object disposed within the environment. Consider an instance in which is digital object is an automobile, the panoramic image is usable to view the automobile from different viewpoints (e.g., a top, front, side, and so forth) that are not viewable together at any one time by a human being. In another instance, the user is disposed at a central point within the environment and the viewpoints include different portions of the environment that are disposed around (e.g., surround) the user.

In an example used to implement a panoramic image, an image-based lighting (IBL) technique is employed that utilizes an environment map to define an environment as well as lighting conditions within the environment of the panoramic image. The environment map, for instance, is usable to capture the lighting conditions as part of a three-hundred-and-sixty-degree view of the environment. As such, the environment map is also usable to define lighting conditions of digital objects disposed within the environment. The environment map, for instance, is usable to define an effect of light reflected by digital objects in the environment, which is then blended with textures of the digital objects. In this way, the digital objects are provided with a realistic appearance as part of the environment.

Conventional techniques used to implement environment maps, however, are confronted with technical challenges resulting from a vast amount of data used to represent the different views of environment as well as lighting conditions within the environment. Consequently, conventional techniques in real world scenarios support limited image quality thereby making these techniques unsuited for use in generation of digital images or involve consumption of a vast amount of computational resources, e.g., to store, render, and/or display the environment and digital objects disposed within the environment.

Accordingly, environment map upscaling techniques are described for digital image generation. These techniques operate to improve computational resource consumption efficiency. The upscaling techniques, for instance, maintain efficiency in an amount of data stored as part of the environment map yet still support functionality that is not available via conventional techniques, such as to generate a two-dimensional digital image based on the environment map.

In one or more examples, an environment map is received by a digital image generation system. The environment map is configured to depict an environment including lighting conditions within the environment. The environment map, for instance, is configured to support image-based lighting (IBL) that uses high dynamic range images (HDRIs) to represent lighting conditions within an environment, e.g., to represent a physical environment, a virtual environment, and so forth. High dynamic range (HDR), for instance, expands a range of luminosity values over that supported by standard dynamic range (SDR) images. The lighting conditions defined by the environment map are also applicable to digital objects (e.g., three-dimensional digital objects) that are to be disposed within the environment, e.g., to define hard and soft shadows, reflection of light off surfaces, and so forth.

The environment map supports a variety of viewpoints with respect to the environment. The environment map, for instance, is usable to define an environment in which a digital object is to be disposed. In a digital image generation scenario involved in "staging" a digital object, a user interface is output that depicts the environment and the digital object is then "added" to the environment. As previously described, however, the environment map in conventional scenarios is typically not suitable for use in digital image generation, such as to depict a background of the digital image in which in the digital object is disposed in a foreground of the digital image.

To address this technical challenge, the digital image generation system employs an environment map upscaling module that is configurable to improve visual quality of the background of the digital image in the above example with reduced computational resource consumption as compared with conventional techniques. Continuing with the previous example, a user input is received to navigate to a particular view of the environment in a user interface as defined by the environment map. A viewpoint is detected by the digital image generation system as used to identify a map fragment of the environment map that corresponds to the viewpoint, e.g., the map fragment that supports the visual portion of the environment map displayed in the user interface.

The map fragment is then passed as an input by the digital image generation system to an environment map upscaling module. The environment map upscaling module is configured to upscale the map fragment to form an upscaled map fragment, e.g., that is suitable for use as a background of a digital image. The upscaling may be performed in a variety of ways, examples of which include use of machine learning by a machine-learning model such as a super-resolution convolutional neural network (SRCN), an enhanced deep super-resolution network (EDSR), a generative adversarial network (GAN), generative artificial intelligence (AI), and so forth. Techniques are also usable that do not employ machine learning, examples of which include bilinear interpolation, bicubic interpolation, nearest-neighbor interpolation, and so on.

The upscaled map fragment is then used to form a background of the digital image. In order to form the foreground in this example, a digital object lighting module is configured to apply lighting conditions defined by the environment map to the digital object to define hard and soft shadows, reflection of light off surfaces, and so forth with respect to the digital object. The digital image having the foreground and the background is then output, e.g., for display in the user interface, which may be performed in real time. The upscaled map fragment, for instance, is displayed "above" the environment map in the user interface, and the process is repeated responsive to movement of the viewpoint, e.g., to obtain a different point of view with respect to the digital object with the environment as the background, a different viewpoint of the background itself, and so forth. In this way, the techniques described herein are configurable to leverage legacy environment maps and are able to avoid immense file sizes as involved in conventional techniques in support of higher resolutions. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Digital Image Generation and Upscaling Environment

FIG. 1 is an illustration of a digital medium environment 100 in an example implementation that is operable to employ digital image generation techniques and environment map upscaling as described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to a low-resource device with limited memory and/or processing resources, e.g., mobile devices. Additionally, although a single computing device 102 is shown, the computing device 102 is also representative of a plurality of different devices, such as multiple servers utilized by a business to perform operations "over the cloud" as described in FIG. 7.

The computing device 102 is illustrated as including an image processing system 104. The image processing system 104 is implemented at least partially in hardware of the computing device 102 to process and transform digital content 106, which is illustrated as maintained in a storage device 108 of the computing device 102. Such processing includes creation of the digital content 106, modification of the digital content 106, and rendering of the digital content 106 in a user interface 110 for output, e.g., by a display device 112. Digital content 106 is configurable in a variety of ways, examples of which include digital images, digital video, digital media, digital documents, and so forth. Although illustrated as implemented locally at the computing device 102, functionality of the image processing system 104 is also configurable in whole or in part via functionality available via the network 114, such as part of a web service or "in the cloud."

An example of functionality incorporated by the image processing system 104 to process the digital content 106 is illustrated as a digital image generation system 116 that is configured to generate a digital image 118. As part of generating the digital image 118 in this example, an environment map upscaling module 120 is configured to upscale a fragment of an environment map 122 that is to be used as part of generating the digital image 118, e.g., to form a background. A digital object 124, for instance, is to be used as a foreground while the environment map 122 is to be used as a basis to form the background of the digital image. 118. The digital object 124 is configurable in a variety of ways, e.g., a vector object defined in three-dimensions, raster object, procedural object, and so forth.

In the illustrated example, the environment map 122 defines a beach scene and lighting conditions of the beach scene. The digital object 124 defines a beach chair in three dimensions, e.g., mathematically as a vector object. Accordingly, in this example user navigation is performed to arrive as a desired fragment of the environment map 122 to form the background. The environment map 122 defines lighting conditions within the depicted environment, and as such is also usable to define lighting conditions with respect to the digital object 124, e.g., to define a shadow cast by the digital object 124 onto the environment and effect of light on the digital object 124 as illustrated. Through use of the environment map upscaling module 120, the background of the digital image 118 is generated with increased detail as shown in the example 126 as rendered and displayed in the user interface 110 by the display device 112. Further discussion of these and other techniques is included in the following section and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Environment Map Upscaling

The following discussion describes environment map upscaling techniques that are implementable utilizing the described systems and devices. Aspects of the procedure is implemented in hardware, firmware, software, or a combination thereof. The procedure is shown as a set of blocks that specify operations performable by hardware and are not necessarily limited to the orders shown for performing the operations by the respective blocks. Blocks of the procedure, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm. In portions of the following discussion, reference will be made in parallel to FIG. 6, which is a flow diagram depicting an algorithm 600 as a step-by-step procedure in an example implementation of operations performable for accomplishing a result of environment map upscaling as part of digital image generation.

In this example, the image processing system 104 of FIG. 1 is configured to implement a staging tool to assemble three dimensional scenes that support placement of digital objects, control of lighting conditions, and viewpoint (e.g., "camera") placement, e.g., for rendering two-dimensional digital images. The image processing system 104, for instance, is configurable to support layout, texturing, lighting, and framing of digital objects within an environment. Therefore, in this example the environment map upscaling module 120 is configured to improve visual quality and resolution of portions of the environment defined by the environment map 122 in support of generating two-dimensional digital images from the three-dimensional scene defined by the environment map 122.

Figure 2:
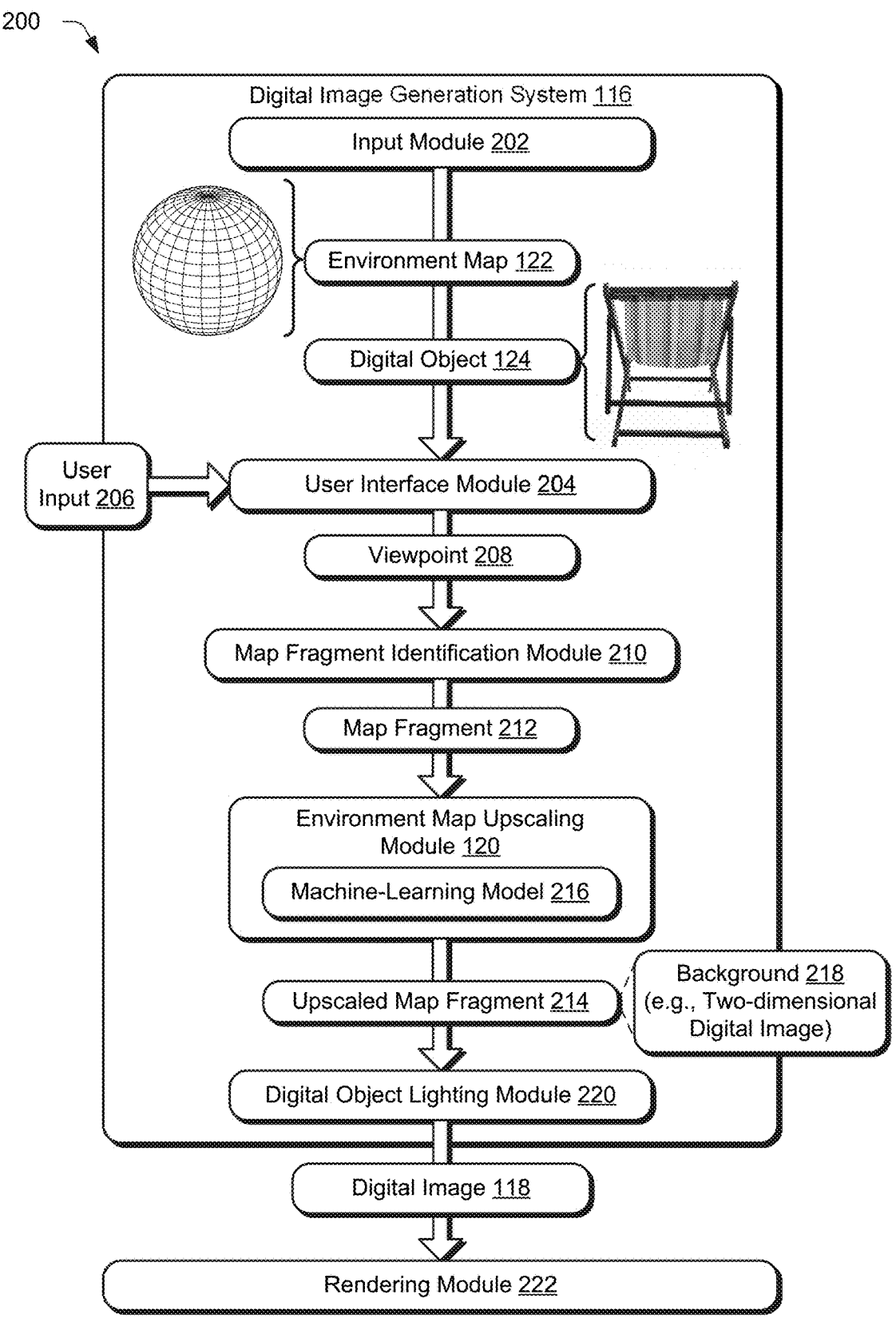
FIG. 2 depicts a system in an example implementation showing operation of a digital image generation system and environment map upscaling module of FIG. 1 in greater detail.

FIG. 2 depicts a system 200 in an example implementation showing operation of a digital image generation system and environment map upscaling module of FIG. 1 in greater detail. To begin, an input module 202 receives an environment map 122 and a digital object 124. The environment map defines lighting conditions within a panoramic view of an environment (block 602). The environment map, for instance, is configured as a three-dimensional map as a three-hundred and sixty degree digital image that depicts the environment and captures an effect of light within the environment, e.g., relative positions of light sources and effects of the light emitted by the sources within the environment. The environment map 122, for instance, is configurable to support an image-based lighting (IBL) technique usable to capture the lighting conditions as part of a three-hundred-and-sixty-degree view of the environment. As such, the environment map is also usable to define lighting conditions of digital objects disposed within the environment.

The digital object 124 is configurable in a variety of ways, e.g., as a two-dimensional object, three-dimensional object, and so forth. As a three-dimensional object, the digital object 124 is configurable to take into account lighting conditions defined within the environment by the environment map 122 as further described below. Examples of digital object 124 configurations in three dimensions include polygonal modeling, non-uniform rational B-splines (NURBS) modeling, voxel modeling, procedural model, point clouds, and so forth.

Figure 3:
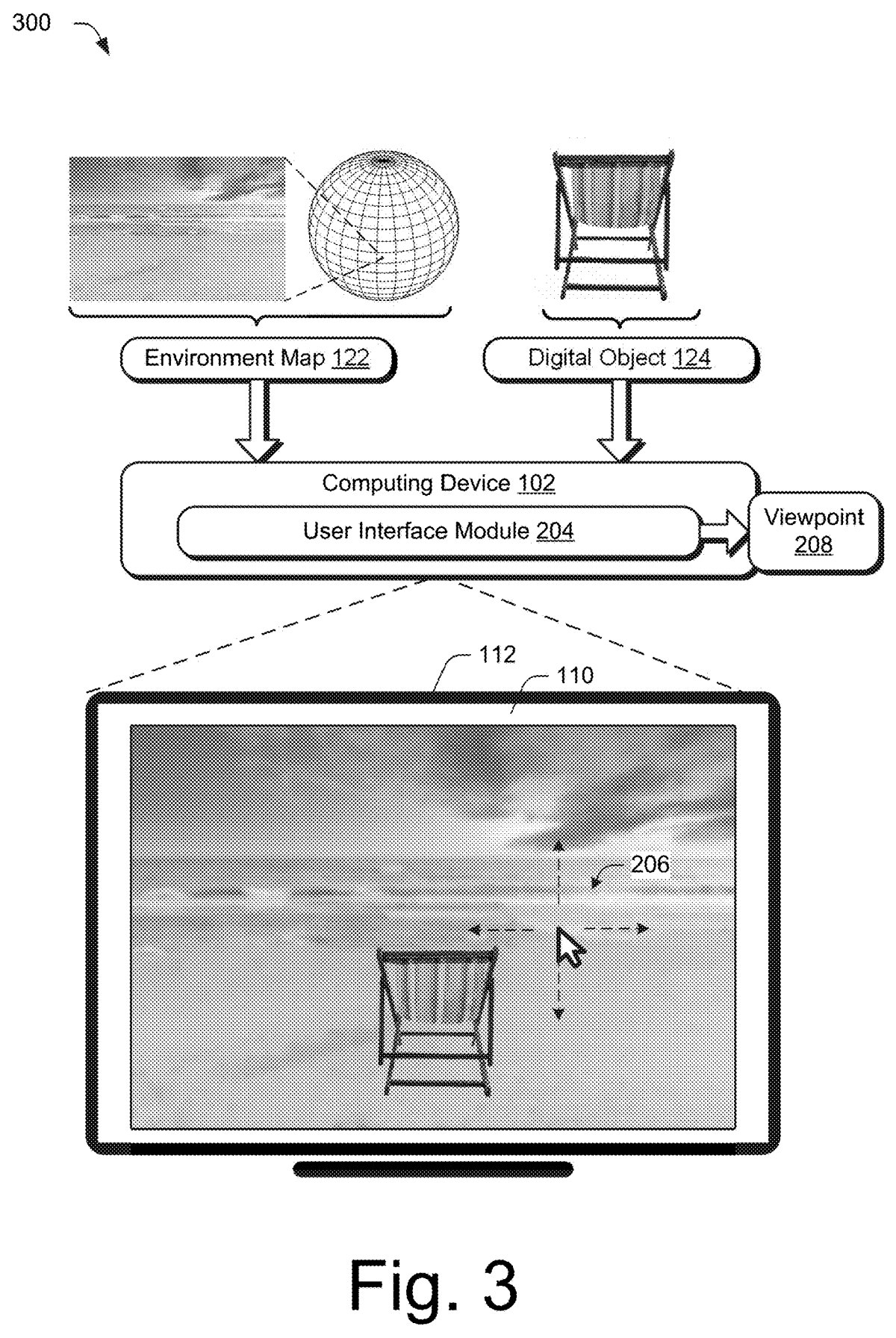

The environment map 122 and the digital object 124 are then passed to a user interface module 204. FIG. 3 depicts a system 300 in an example implementation showing operation of the user interface module 204 in greater detail as outputting a user interface 110 that is usable to navigate between viewpoints supported by the environment map 122. The user interface 110 includes a display of the environment map 122 as well as a display of the digital object 124.

A user input 206 is received via the user interface 110 to navigate between different viewpoints of the environment map 122. In the illustrated example, for instance, the user input 206 is usable to navigate "around" the beach chair to show different angles of the beach chair and corresponding portions of the environment map 122 as a background. The user input 206 is configurable in a variety of ways, such as through use of a "click-and-drag" operation using a cursor control device as illustrated, a gesture, a spoken utterance, keyboard controls, and so forth.

The user interface module 204 then detects a viewpoint with respect to the panoramic view in the environment map (block 604). The viewpoint 208, for instance, is detected based on the navigation performed with respect to the user interface 110. The viewpoint 208 is definable as the input is received in real time, definable upon completion of the navigation operation, and so forth.

Returning the discussion to FIG. 2, the viewpoint 208 is then output to a map fragment detection module 210. The map fragment detection module 210 is configured to identify a map fragment 212 from the environment map 122 based on the detected viewpoint 208 (block 606). The map fragment 212, for instance, is based on a portion of the environment map 122 displayed in the user interface 110 by the user interface module 204 during the navigation as previously described in relation to FIG. 3. As part of identifying the map fragment 212, a corresponding portion of the environment map 122 is projected to form a two-dimensional digital image.

The map fragment 212, for instance, may include a portion of the environment taken from the environment map 122 for display in the user interface 110 based on the viewpoint 208. The map fragment 212 may also include an additional region (e.g., as a buffer region), defined within the viewable portion (e.g., to support different aspect ratios), and so forth. The map fragment 212 is then passed as an input to the environment map upscaling module 120 to generate an upscaled map fragment 214.

Figure 4:
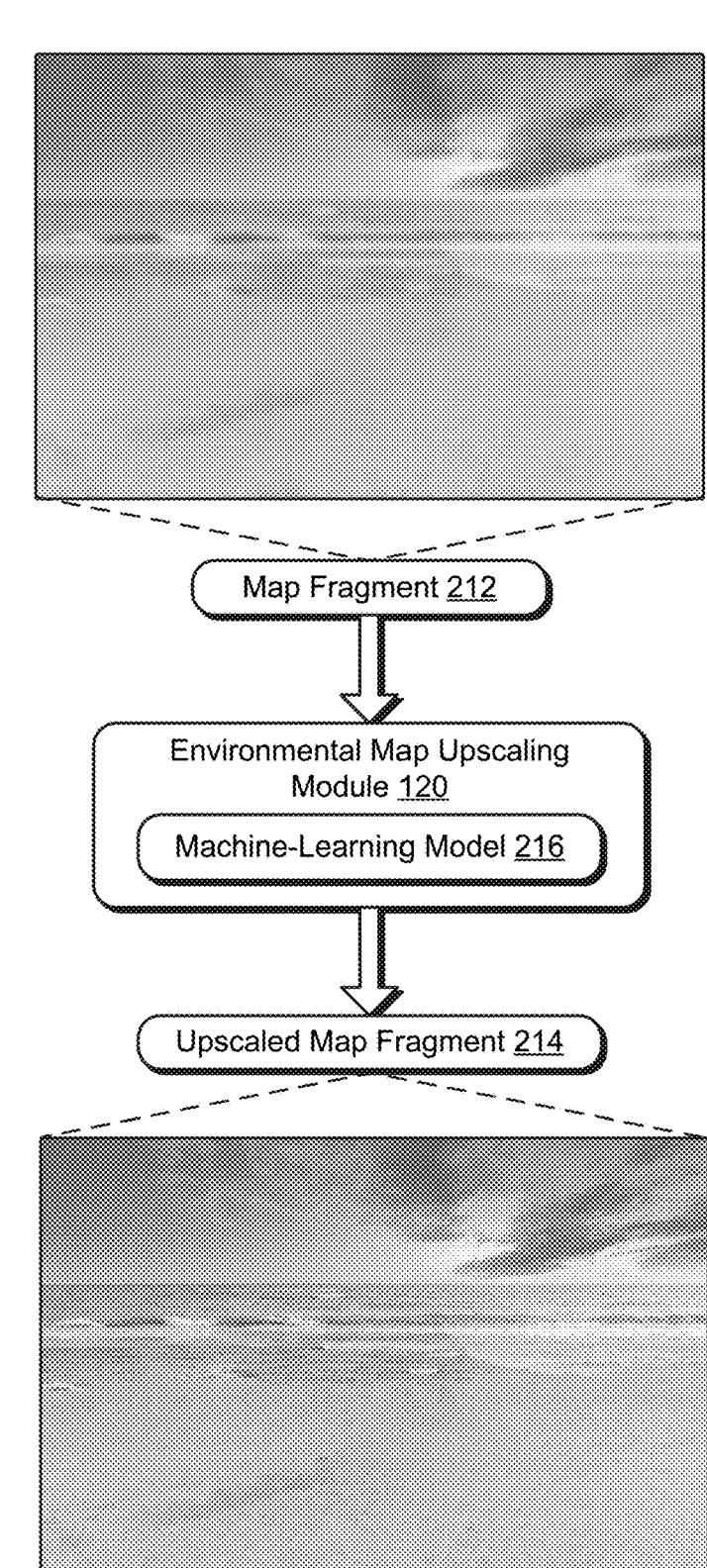
FIG. 4 depicts a system in an example implementation showing operation of an environment map upscaling module of FIG. 2 in greater detail as generating an upscaled map fragment.

FIG. 4 depicts a system 400 in an example implementation showing operation of environment map upscaling module 120 in greater detail as generating an upscaled map fragment 214. The environment map upscaling module 120 is configured to increase a resolution of the map fragment 212 to form the upscaled map fragment 214.

The environment map upscaling module 120 is configured to form the upscaled map fragment 214 by upscaling the map fragment 212 (block 608) in a variety of ways. The environment map upscaling module 120, for instance, is configurable to upscale the map fragment 212 using bilinear interpolation, bicubic interpolation, nearest-neighbor interpolation, and so on.

The environment map upscaling module 120 is also configurable to employ a machine-learning model 216 to upscale the map fragment 212. Examples of machine-learning model 216 configurations usable to do so include a super-resolution convolutional neural network (SRCN), an enhanced deep super-resolution network (EDSR), a generative adversarial network (GAN), generative artificial intelligence (AI), and so forth. Thus, as illustrated in FIG. 4 a level of detail exhibited by the map fragment 212 is increased in the upscaled map fragment 214 such that the upscaled map fragment 214 is suitable for use as a background 218, e.g., of a two-dimensional digital image.

The digital image generation system 116 then generates the digital image 118 based on the upscaled map fragment 214 and the digital object 124 (block 610). A digital object lighting module 220, for instance, is configurable to apply the lighting conditions defined by the environment map 122 to the digital object 124, which is then output for rendering by the rendering module 222, e.g., for display in a user interface 110 by a display device 112.

Figure 5:
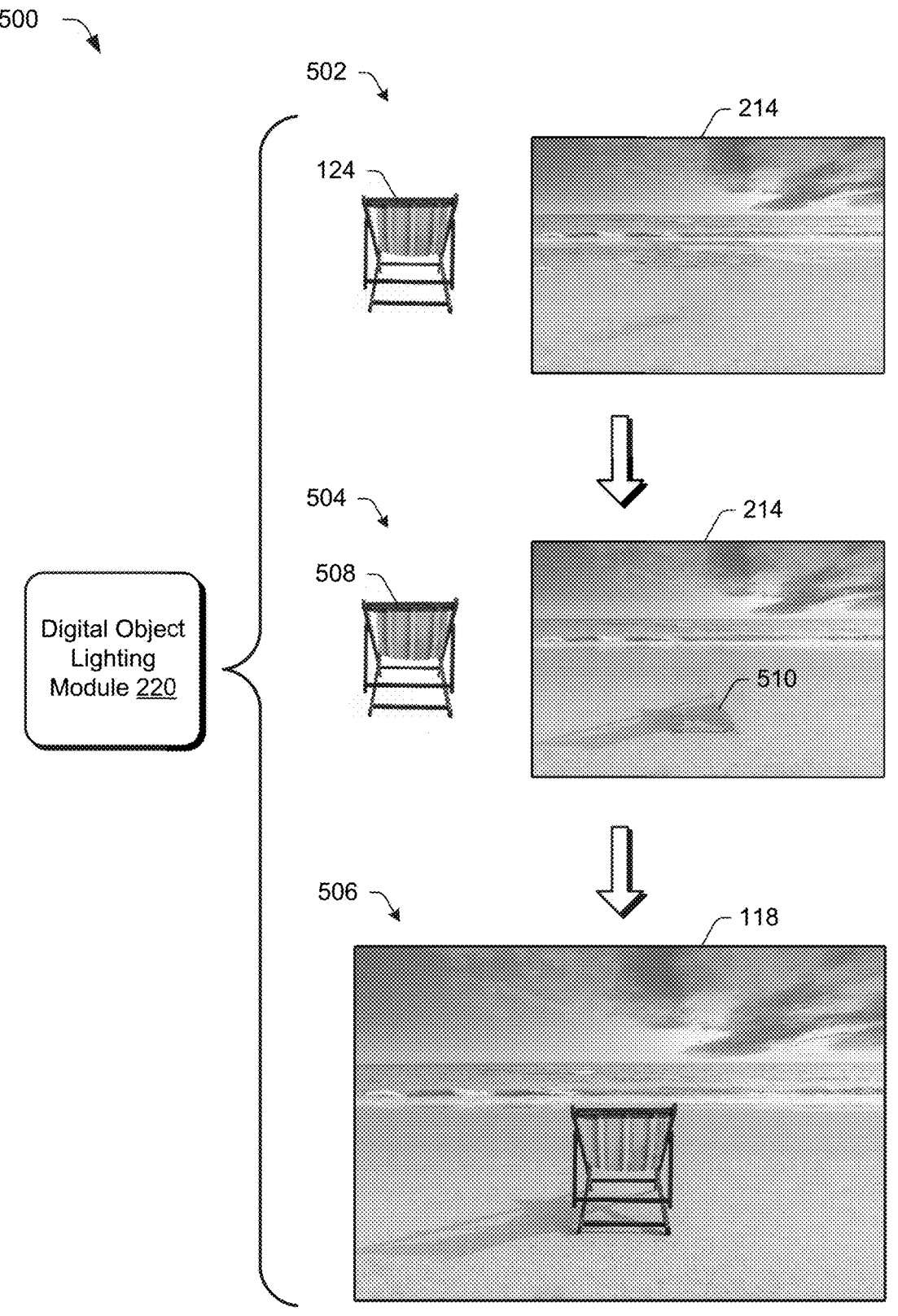
FIG. 5 depicts a system in an example implementation showing operation of a digital object lighting module of FIG. 2 in greater detail as applying lighting conditions defined by the environment map to the digital object.

FIG. 5 depicts a system in an example implementation 500 showing operation of the digital object lighting module 220 in greater detail as applying lighting conditions defined by the environment map 122 to the digital object 124. The example implementation 500 is illustrated using first, second, and third stages 502, 504, 506.

At the first stage 502, the digital object 124 and upscaled map fragment 214 are received as an input. The digital object 124 is to be used as a foreground of the digital image 118 and the digital object 124 is to be used as a background of the digital image 118, e.g., in respective layers.

At the second stage 504, lighting conditions defined by the environment map 122 are applied to the digital object 124 to generate a lighted digital object 508. The digital object lighting module 220, for instance, defines hard and soft shadows, reflection of light off surfaces, and so forth.

These lighting conditions are then applied to textures of the digital object 124 to generate the lighted digital object 508.

Likewise, an effect of the digital object 124 on the lighting conditions is also applied to environment map 122, e.g., before or after upscaling. At the second stage 504, this effect is illustrated as a shadow 510 cast on a beach in the environment, e.g., on the sand. As a result, the lighted digital object 508 is positioned in a foreground in the digital image 118 and the upscaled map fragment 214 having the shadow 510 is used as a background, which improves visual accuracy and detail over conventional techniques. The foreground, for instance, is configured as a foreground layer and the background is configured as a background layer of the digital image 118.

Example System and Device

Figure 7:
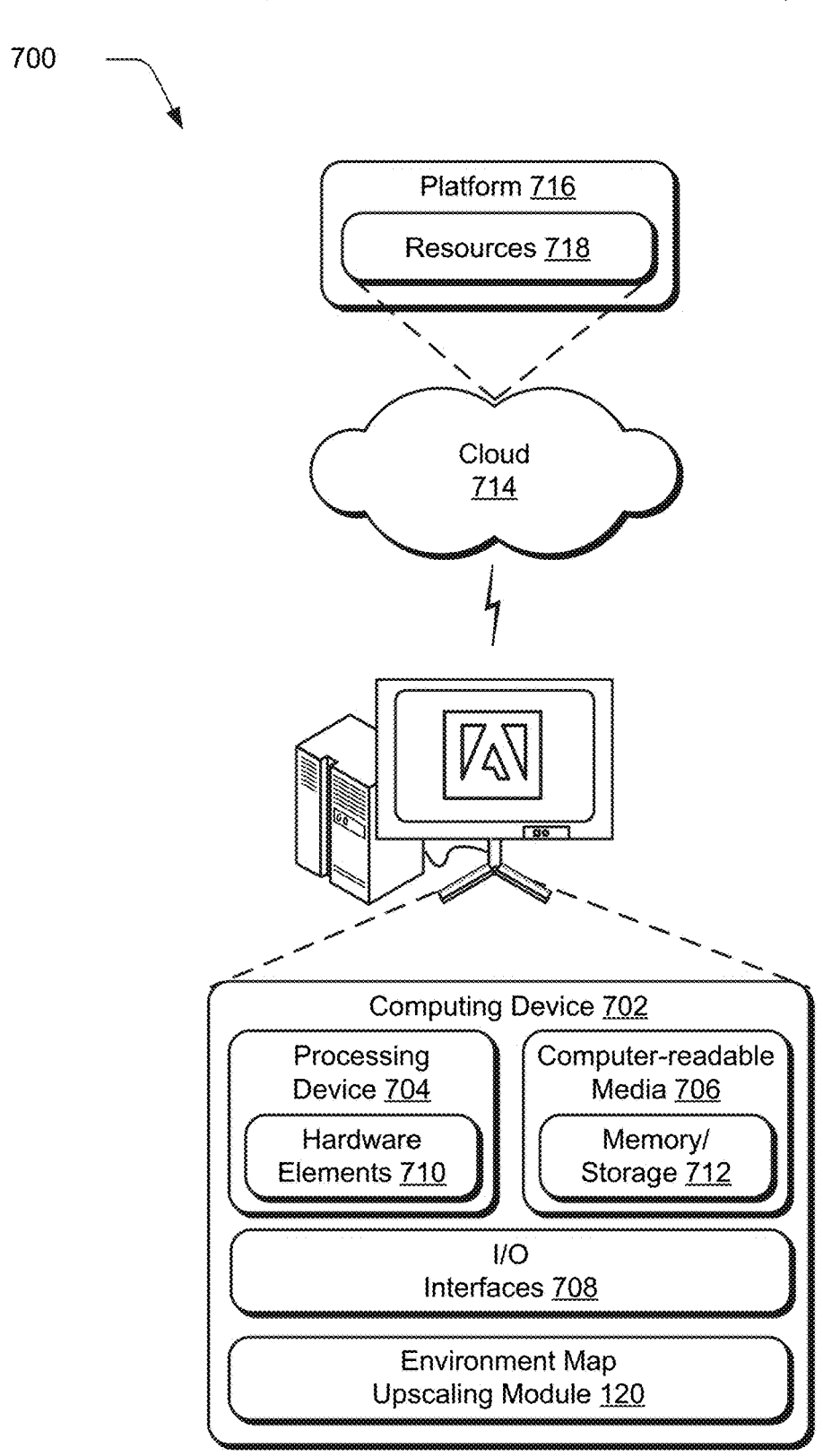
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that implement the various techniques described herein. This is illustrated through inclusion of the environment map upscaling module 120. The computing device 702 is configurable, for example, as a server of a service provider, a device associated with a client (e.g., a client device), an on-chip system, and/or any other suitable computing device or computing system.

The example computing device 702 as illustrated includes a processing device 704, one or more computer-readable media 706, and one or more I/O interface 708 that are communicatively coupled, one to another. Although not shown, the computing device 702 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 704 is representative of functionality to perform one or more operations using hardware. Accordingly, the processing device 704 is illustrated as including hardware element 710 that is configurable as processors, functional blocks, and so forth. This includes implementation in hardware as an application specific integrated circuit or other logic device formed using one or more semiconductors. The hardware elements 710 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 706 is illustrated as including memory/storage 712 that stores instructions that are executable to cause the processing device 704 to perform operations. The memory/storage 712 represents memory/storage capacity associated with one or more computer-readable media. The memory/storage 712 includes volatile media (such as random access memory (RAM)) and/or nonvolatile media (such as read only memory (ROM), Flash memory, optical disks, magnetic disks, and so forth). The memory/storage 712 includes fixed media (e.g., RAM, ROM, a fixed hard drive, and so on) as well as removable media (e.g., Flash memory, a removable hard drive, an optical disc, and so forth). The computer-readable media 706 is configurable in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 702. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 702, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 710. The computing device 702 is configured to implement particular instructions and/or functions corresponding to the software and/or hardware modules. Accordingly, implementation of a module that is executable by the computing device 702 as software is achieved at least partially in hardware, e.g., through use of computer-readable storage media and/or hardware elements 710 of the processing device 704. The instructions and/or functions are executable/operable by one or more articles of manufacture (for example, one or more computing devices 702 and/or processing devices 704) to implement techniques, modules, and examples described herein.

The techniques described herein are supported by various configurations of the computing device 702 and are not limited to the specific examples of the techniques described herein. This functionality is also implementable all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 include applications and/or data that can be utilized while computer processing is executed on servers that are remote from the computing device 702. Resources 718 can also include services provided over the Internet and/or through a subscriber network, such as a cellular or Wi-Fi network.

The platform 716 abstracts resources and functions to connect the computing device 702 with other computing devices. The platform 716 also serves to abstract scaling of resources to provide a corresponding level of scale to encountered demand for the resources 718 that are implemented via the platform 716. Accordingly, in an interconnected device embodiment, implementation of functionality described herein is distributable throughout the system 700. For example, the functionality is implementable in part on the computing device 702 as well as via the platform 716 that abstracts the functionality of the cloud 714.

In implementations, the platform 716 employs a "machine-learning model" that is configured to implement the techniques described herein. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a processing device, the method comprising:
   receiving, by the processing device, a digital object and an environment map defining lighting conditions within a panoramic view of an environment;
   receiving a user input as navigating to a view as displayed within a user interface of the environment as defined by the environment map;
   detecting, by the processing device, a viewpoint with respect to the panoramic view in the environment map that corresponds to the view;
   identifying, by the processing device, a map fragment from the environment map based on the detected viewpoint;
   forming, by the processing device, an upscaled map fragment by upscaling the map fragment;
   applying, by the processing device, at least one lighting condition to the digital object based on the lighting conditions defined by the environment map; and
   generating, by the processing device, a digital image based on the upscaled map fragment and the digital object as having the at least one lighting condition, the digital object configured as a foreground layer and the upscaled map fragment configured as a background layer of the digital image.

2. The method as described in claim 1, wherein the upscaling is performed, at least in part, using machine learning through execution of a machine-learning model.

3. The method as described in claim 2, wherein the machine-learning model is a convolutional neural network.

4. The method as described in claim 1, wherein the upscaling is performed, at least in part, using bilinear interpolation, bicubic interpolation, or nearest-neighbor interpolation.

5. The method as described in claim 1, wherein the detecting is performed based on a visible portion of the environment map displayed in the user interface.

6. The method as described in claim 1, wherein the upscaled map fragment is configured as a two-dimensional digital image.

7. The method as described in claim 1, wherein the upscaled map fragment forms a background of the digital image and the digital object is positioned in a foreground of the digital image.

8. The method as described in claim 1, wherein the panoramic view supports a three-hundred-and-sixty-degree view of the digital object as disposed within the environment.

9. The method as described in claim 1, wherein the environment map defines the lighting conditions using a high dynamic range as part of an image-based lighting technique.

10. A computing device comprising:
   a processing device; and
   a computer-readable storage medium storing instructions that, responsive to execution by the processing device, causes the processing device to perform operations including:
      receiving a user input as navigating to a view as displayed within a user interface of an environment as defined by an environment map;
      detecting a viewpoint, as displayed via the user interface, defined with respect to a three-dimensional environment as a visible portion of the environment map;
      identifying a map fragment from an environment map based on the viewpoint, the environment map defining a three-dimensional environment and lighting conditions within the three-dimensional environment; and
      generating a background of a two-dimensional digital image by upscaling the map fragment using a machine-learning model.

11. The computing device as described in claim 10, wherein the machine-learning model is a convolutional neural network.

12. The computing device as described in claim 10, wherein the upscaling is performed, at least in part, using bilinear interpolation, bicubic interpolation, or nearest-neighbor interpolation.

13. The computing device as described in claim 10, wherein the three-dimensional environment supports a three-hundred-and-sixty-degree view.

14. The computing device as described in claim 10, wherein the environment map defines lighting conditions using a high dynamic range (HDR) as part of an image-based lighting technique.

15. The computing device as described in claim 10, wherein a digital object is configured in a foreground as a foreground layer and the upscaled map fragment is configured as the background as a background layer of the two-dimensional digital image.

16. One or more computer readable storage media storing instructions that, responsive to execution by a processing device, causes the processing device to perform operations including:
   generating a background of a digital image, the generating including:
      receiving a user input as navigating to a view as displayed within a user interface of an environment as defined by an environment map;
      detecting a viewpoint with respect to a panoramic view in the environment map that corresponds to the view;
      identifying a map fragment from the environment map based on a viewpoint detected with respect to an environment map, the environment map defining lighting conditions within an environment; and
      forming an upscaled map fragment by upscaling the map fragment using a machine learning model;

generating a foreground of the digital image by applying at least one lighting condition to a digital object based on the lighting conditions defined by the environment map; and outputting the digital image as including the foreground and the background.

17. The one or more computer readable storage media as described in claim 16, wherein the foreground is configured as a foreground layer and the background is configured as a background layer of the digital image.

18. The one or more computer readable storage media as described in claim 16, wherein the viewpoint is based on a visible portion of the environment map displayed in a user interface.

19. The one or more computer readable storage media as described in claim 16, wherein the environment map defines the lighting conditions in a high dynamic range (HDR) as part of an image-based lighting technique.

20. The one or more computer readable storage media as described in claim 16, wherein the digital object is configured as a foreground layer and the upscaled map fragment is configured as a background layer of the digital image.

\* \* \* \* \*